UNITED STATES PATENT OFFICE.

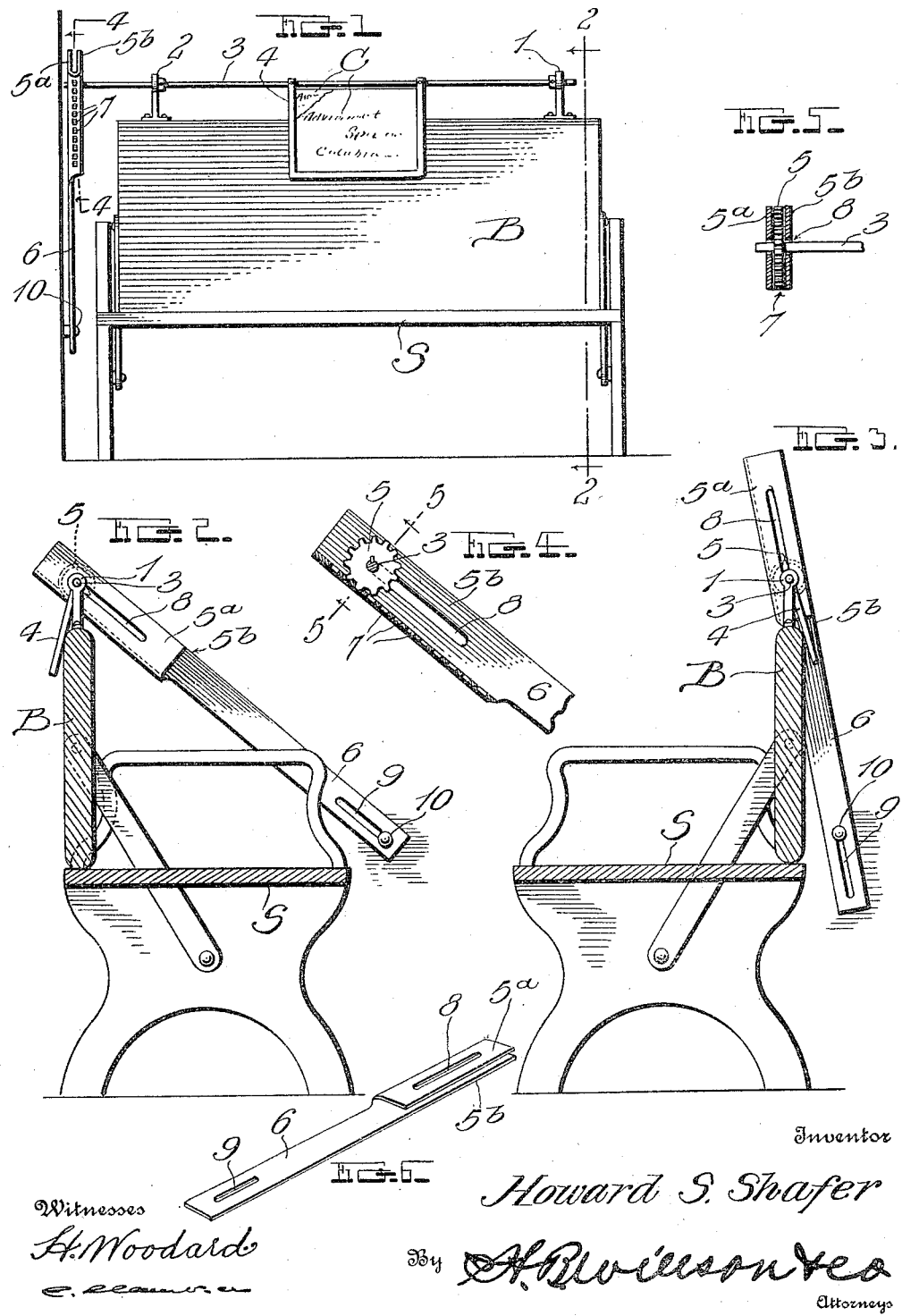

HOWARD S. SHAFER, OF NAZARETH, PENNSYLVANIA.

ADVERTISING DEVICE.

1,139,812.    Specification of Letters Patent.    Patented May 18, 1915.

Application filed September 3, 1914. Serial No. 860,057.

*To all whom it may concern:*

Be it known that I, HOWARD S. SHAFER, a citizen of the United States, residing at Nazareth, in the county of Northampton and State of Pennsylvania, have invented certain new and useful Improvements in Advertising Devices; and I do declare the following to be a full, clear, and exact description of the invention, such as will enable others skilled in the art to which it appertains to make and use the same.

This invention relates to improvements in card holders and more particularly to reversing mechanism for advertising cards.

The object of the invention is to provide an advertising device for attachment to reversible vehicle seats and which is so constructed that it will be automatically turned on the shifting of the seat back in order that it will always be exhibited on the rear of a seat back in position to be observed by the occupant of the seat in the rear of that carrying the card.

With this and other objects in view the invention consists of certain novel features of construction, combination and the arrangement of parts as will be more fully described and claimed.

In the accompanying drawings: Figure 1 is a rear elevation of a car seat equipped with my invention; Figs. 2 and 3 are vertical transverse sections taken on the line 2—2 of Fig. 1 and showing the two positions of the seat back and the parts operable therewith. Fig. 4 is a detail section taken on the line 4—4 of Fig. 1; Fig. 5 is a transverse section as seen on line 5—5 of Fig. 4, and Fig. 6 is a perspective view of one of the operating levers.

In the embodiment illustrated a car seat S of the usual construction is shown having a back B adapted to slide back and forth for reversing the seat when desired. Mounted on the upper edge of this back B are longitudinally spaced bearings 1 and 2 in which is revolubly mounted a shaft 3, which extends longitudinally of said seat back. Depending from this shaft 3 is a card holder 4 of any desired construction in which a plurality of cards C may be mounted with their advertising faces disposed outward. A gear wheel 5 is fixed to the inner end of the shaft 3 and extends beyond the end of the seat back into the space between it and the side of the car.

Pivotally mounted on the side of the car at a point spaced from the center of the seat S is an operating lever or arm 6 one end of which is preferably U-shaped in cross section and provided with apertures 7 in the intermediate connecting portion thereof which form a rack for engagement with the teeth of the gear 5. This gear 5 is positioned between the side members 5ª and 5ᵇ of said lever with the shaft on which it is mounted extending through registering longitudinally disposed slots 8 formed in the side members of the lever at one end thereof. A similar slot 9 is formed in the side member 5ᵇ of this lever at the other end and the pivot stud 10 which connects the lever with the car extends through said slot.

It is well known that when seat backs of this character are reversed they travel in an arcuate path and the slot 9 in the lower or connecting end of the lever 6 provides for this movement and adapts the lever to move with the seat back until one end of the slot 9 contacts with the stud 10, whereupon the lever 6 causes the gear 5 to rotate sufficiently by its engagement with the apertures 7 in said lever to turn the shaft 3 a partial revolution and thereby cause the card holder 4 to turn from one side of the seat back to the other and thus position it with one of its advertising faces disposed for inspection by the occupants of the rear seats.

From the above description it will be obvious that the shifting of the seat back will cause the card holder to turn over and expose first the card on one side thereof and alternately the card on the other side thereof and that these cards may contain any desired form of advertising or other matter which it is desired to bring to the attention of the occupants of the vehicle.

I claim as my invention:

1. The combination with a reciprocatory supporting structure, a shaft revolubly mounted thereon, a card holder fixed to said shaft, a gear fixed to said shaft, a pivotally mounted operating lever having teeth for engagement by said gear whereby said shaft is turned on the reciprocation of said supporting structure to turn said card holder, said lever being slotted at its opposite ends for the passage of said shaft and for its pivot respectively.

2. The combination with a shiftable support of a shaft revolubly mounted on said support, a gear fixed to said shaft, a display member carried by said shaft, an operating lever pivotally mounted adjacent said support and having rack teeth positioned for intermeshing engagement with the gear carried by said shaft, said lever being slotted for the passage of the gear carrying shaft.

3. A car seat back having longitudinally spaced bearings on its upper edge, a shaft revolubly mounted in said bearings, a display device fixed on said shaft, a gear fixed to said shaft and extending beyond the end of said car seat back, an operating lever U-shaped in cross section at one end and pivotally mounted at its other end adjacent said seat, and slotted longitudinally at its opposite ends, the connecting portion or cross bar of said U-shaped end having perforations therein for intermeshing engagement with the gear on said shaft, said shaft extending through the slots in the walls of the U-shaped end of said lever with its gear positioned between the walls thereof.

4. The combination with a car seat back, of longitudinally spaced bearings mounted on the upper edge thereof, a shaft revolubly mounted in said bearings, a card holder fixed to said shaft, one end of said shaft projecting beyond the end of the car seat back, a gear mounted on said projecting end and fixed thereto, a lever substantially U-shaped in cross section at one end and having registering slots in the side members thereof and having its opposite end slotted, a pivot pin extending through the slot at one end thereof, said shaft extending through the slots at the other end of said lever with the gear thereon positioned between the side members of said U-shaped lever end, and rack teeth on said lever for engagement by said gear.

In testimony whereof I have hereunto set my hand in presence of two subscribing witnesses.

HOWARD S. SHAFER.

Witnesses:
GRANVILLE J. BECK,
WILSON E. BECK.

Copies of this patent may be obtained for five cents each, by addressing the "Commissioner of Patents, Washington, D. C."